Figure 1:
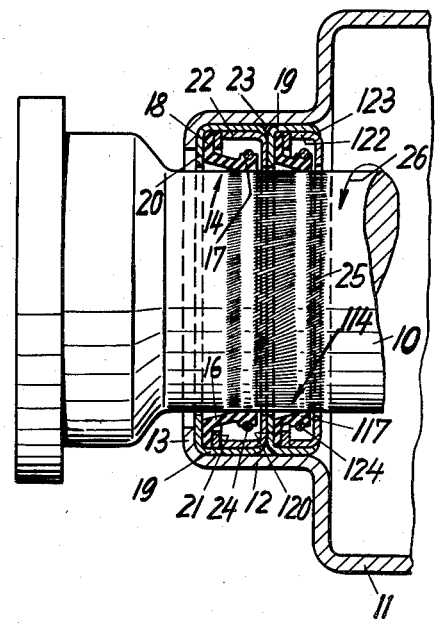

Jan. 20, 1959 W. R. NAUMANN 2,869,295
METHOD OF FORMING GROOVES ON A SHAFT
Original Filed June 4, 1954

INVENTOR
WILLY R. NAUMANN

BY Dicke and Craig

ATTORNEYS

United States Patent Office 2,869,295
Patented Jan. 20, 1959

2,869,295

METHOD OF FORMING GROOVES ON A SHAFT

Willy R. Naumann, Stuttgart-Degerloch, Germany, assignor to Daimler-Benz Aktiengesellschaft, Stuttgart, Unterturkheim, Germany Original application June 4, 1954, Serial No. 434,496. Divided and this application November 21, 1955, Serial No. 552,683

Claims priority, application Germany July 7, 1953

3 Claims. (Cl. 51—289)

The present invention relates to means for sealing the gap between a wall and a rotary shaft extending therethrough.

It is the object of the present invention to provide sealing means of that type which are reliable in operation, exert a minimum of friction on the shaft, have a long life, and have excellent sealing properties. Further objects are to provide an improved method for producing such sealing means.

Further objects of the invention will appear from the description following hereinafter of a preferred embodiment of the present invention, and the features of novelty will be pointed out in the claims. It is to be understood, however, that the description following hereinafter serves the purpose of illustrating the invention rather than that of restricting the same, since the embodiment to be described is capable of numerous structural modifications within the knowledge of those skilled in the art.

Figure 2:
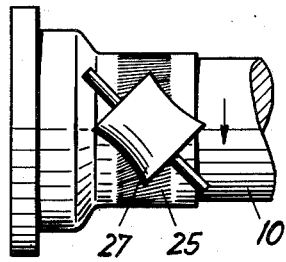
Figure 3:
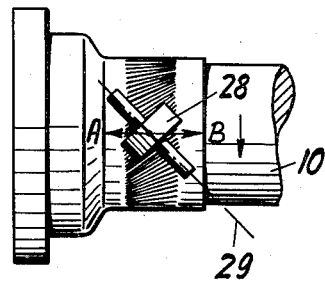

In the drawings,

Fig. 1 is a sectional view of a housing having an opening through which a shaft extends, the gap between the wall of the housing and the shaft being provided with the improved sealing means forming the subject matter of the present invention, Fig. 2 illustrates more or less diagrammatically an improved method of providing the shaft with helical grooves, and Fig. 3 shows an alternative method to be used for the same purpose.

A shaft 10, which may be the crankshaft of an internal combustion engine, projects out of a housing 11, the latter being provided with a cylindrical flange 12 which is coaxially disposed with respect to the shaft 10 and has an inturned rim 13 which is slightly spaced from the shaft.

It is to be understood that shaft 10 is journalled in suitable bearings mounted in the housing 11. For the purpose of sealing the gap between the shaft 10 and the cylindrical flange 12, the latter includes a non-rotatable packing which embraces the shaft. In the embodiment shown, such packing includes a pair of adjacent non-metallic packing rings 14 and 114. The packing ring 14 is formed with a conical portion 16 having a lip 17 mounted in contact with the shaft 10. Moreover, the packing ring 14 is formed with a flat annular portion 18 which is integral with the portion 16. The packing ring 14 is non-rotatably held within the cylindrical flange 12 of the housing. For that purpose, a ring of sheet metal having a cylindrical portion 19 and a flat annular end portion 20 integral therewith is snugly inserted in the flange 12, the flat portion 20 contacting the inside of the rim 13. The flat portion 18 of the packing ring 14 is tightly held against the portion 20 of the sheet metal ring by a washer 21 which, in its turn, is held in position by a sheet metal sleeve 22 which is slipped into the cylindrical portion 19 of the first mentioned sheet metal ring and is firmly connected therewith. To this end, the edge 23 of the cylindrical portion 19 may be peened over the edge of sleeve 22.

The lip 17 is provided with a peripheral groove adapted to accommodate means for pressing the lip 17 against the shaft. In the embodiment shown, such means are formed by a circular helical spring 24.

The other packing ring 114 is similar to the ring 14 and is held in place by similar elements. Therefore, a detailed description of the mounting means is believed to be dispensable herewith. However, the mounting elements are designated by reference numerals formed by the addition of 100 to the numerals applied to the mounting means for ring 14.

For the purpose of the present invention the peripheral zone of shaft 10 against which the packing rings 14 and 114 are pressed by the annular springs 24 and 124 is provided with closely adjacent minute helical grooves 25 which are of such a hand with respect to the direction of rotation of the shaft indicated by arrow 26 that the oil present in the grooves 25 will be urged by the friction with the lips 17 and 117 of the packing rings in inward direction with respect to the housing 11, i. e. towards the right with respect to Fig. 1. While such friction takes place in peripheral direction, it will have an axial component on account of the slanting helical disposition of the grooves 25. It is this component which will feed the oil inwardly and will thus return any oil which may tend to leak outwardly. The grooves 25 may have a depth and width of 0.02 inch. Preferably, however, they are much smaller having a depth of from one tenth to three tenth mil.

Owing to the friction between the lips 17 and 117 and the shaft, the surface of the shaft is subject to a certain wear and polishing effect. As a result, after an extended period of operation of the shaft the grooves will be interrupted within narrow annular regions registering with the annular springs 24 and 124, as is indicated in Fig. 1. These regions, however, have a width less than the lips 17. Therefore, the lips will cooperate with the grooves on either side of each polished region to ensure the desired inward oil-feeding effect. The polished regions ensure that the oil will not leak outwardly through the grooves when the shaft is at rest.

It is important that the depth and width of the grooves be quite minute in order to keep the wear and abrasion of the non-metallic packing rings 14 and 114 within reasonable limits, such rings consisting of an oil-resistant rubber composition or a suitable highly resilient plastic.

In Fig. 2 I have shown how the shaft 10 may be provided with the minute grooves 25. For such purpose, the shaft 10 is brought into contact with a tool 27 which has the shape of a hyperboloidal body of revolution ensuring a linear contact with the shaft. The surface of the body is abrasive, i. e. is provided with minute teeth or granules. While both the shaft and the tool 27 are held against axial displacement, they are simultaneously rotated about their respective shafts, the speed of the shaft 10 being so correlated to the speed of the tool 27 that the relative movement of the surfaces at the line of contact has a direction extending at an acute angle to the axis of the shaft 10. In this manner, the surface of the shaft is provided with the grooves or scratches 25. Of course, the tool 27 must exert a certain pressure upon the shaft 10.

Alternatively, a simple cylindrical tool 28, as illustrated in Fig. 3, may be employed. As this figure shows, the shaft 10 is brought into point contact under pressure with the cylindrical tool 28. The latter has its axis 29 spaced from and inclined to that of shaft 10. The shaft 10 and the tool 28 revolve about their respective axes. At the same time, a reciprocatory relative feed motion must be produced between the shaft 10 and the tool 28 in a direction parallel to the shaft, such feed motion being indicated by the arrows A and B.

While the method described with reference to Fig. 2 permits of a faster operation, the method described with reference to Fig. 3 has the advantage that it requires a very simple and cheap tool only.

The tools 27 and 28 may be grinding wheels or milling tools.

While I have described my invention with reference to a preferred embodiment thereof, I wish it to be clearly understood that the same is in no way limited to the details thereof, but is capable of numerous modifications within the scope of the appended claims.

What I claim is:

1. The method of providing a rotary shaft having a finished surface with closely adjacent helical grooves over a portion of the finished surface thereof, said helical grooves constituting minute return passages for fluid leaking past annular sealing means cooperating with said shaft during rotation of the latter and having a predetermined depth of less than 0.02 inch, preferably only .001 to .003 inch, by means of a grooving device having an axis of rotation, such as a grinding wheel or a polishing wheel provided with abrasive powder, comprising the steps of cutting said grooves of depth of less than 0.02 inch into said shaft by means of said grooving device by simultaneously rotating the latter about said axis which is spaced from and inclined to the axis of said shaft while rotating said shaft about its own axis.

2. The method of providing a rotary shaft having a finished surface with closely adjacent helical grooves constituting minute return passages for fluid leaking past annular seal means cooperating with said shaft during rotation of the latter and having a predetermined depth of less than 0.02 inch which comprises bringing said shaft into linear contact under pressure with an abrasive hyperboloidal surface of revolution and simultaneously rotating said shaft about its axis at a first speed and rotating said hyperboloidal surface about its axis at a second speed while holding said shaft against axial displacement and said surface against axial displacement, said speeds being so correlated that the movement of said surface relative to the surface of said shaft at the line of contact has a direction extending at an acute angle to the axis of said shaft.

3. The method of providing a rotary shaft having a finished surface with closely adjacent helical grooves constituting minute return passages for fluid leaking past annular seal means cooperating with said shaft during rotation of the latter and having a predetermined depth of less than 0.02 inch comprising the steps of bringing said shaft into point contact under pressure with a cylindrical abrasive surface having its axis spaced from and inclined to that of said shaft, simultaneously rotating said shaft and said surface about their respective axes, and producing a reciprocatory relative feed motion between said shaft and said surface in a direction parallel to said shaft.

References Cited in the file of this patent

UNITED STATES PATENTS

| | | |
|---|---|---|
| 1,401,961 | Coryell | Jan. 3, 1922 |
| 2,034,507 | Colson | Mar. 17, 1936 |
| 2,115,908 | Fox | May 3, 1938 |